June 9, 1953 — C. BLICKENDERFER, JR., ET AL — 2,641,288
DOUBLE SAW CARRIAGE FOR LUMBER TRIMMING MACHINES
Filed June 13, 1950 — 4 Sheets-Sheet 1
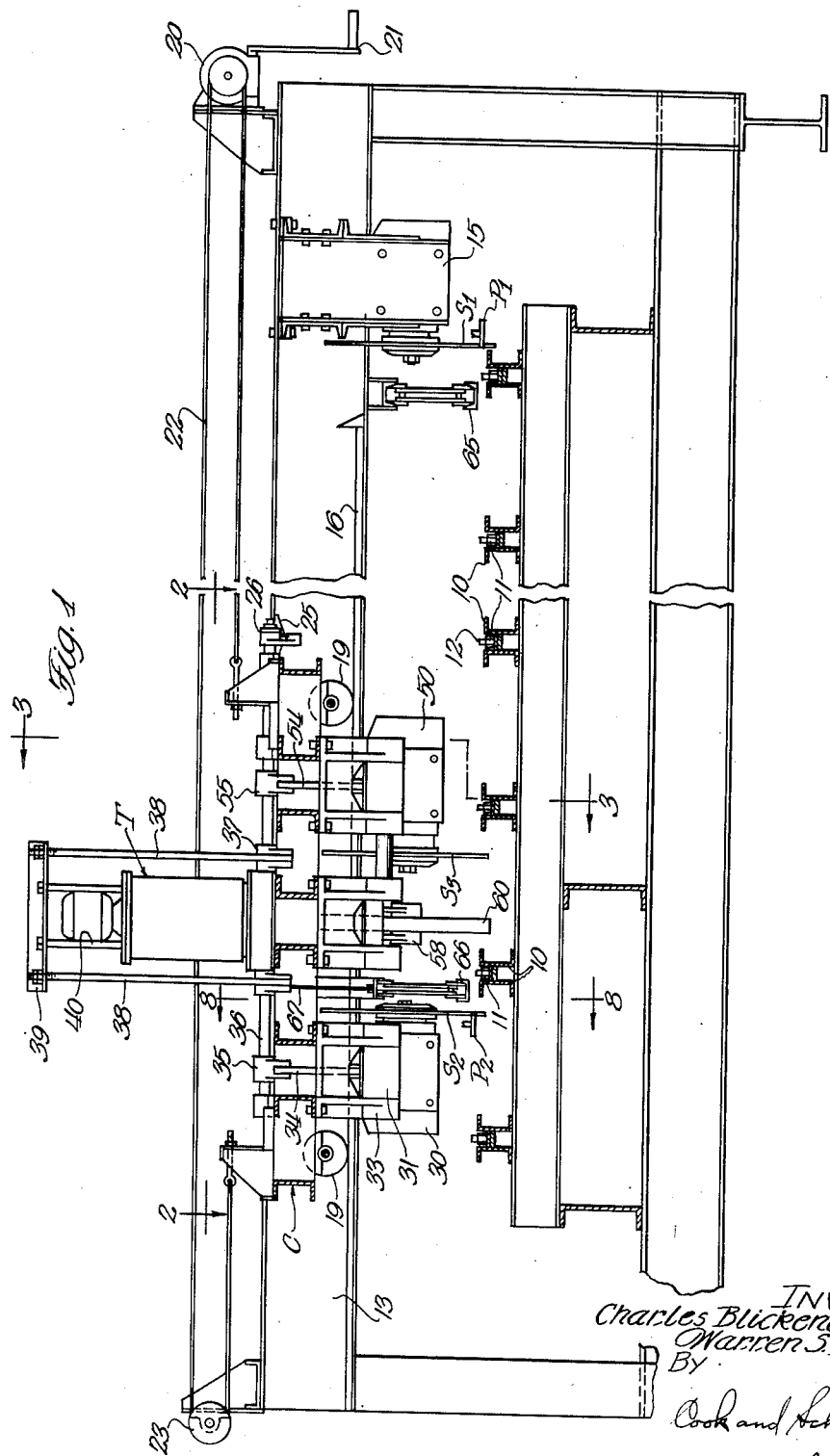
INVENTORS
Charles Blickenderfer Jr.
Warren S Brownfield
By
Cook and Schermerhorn
ATTORNEYS

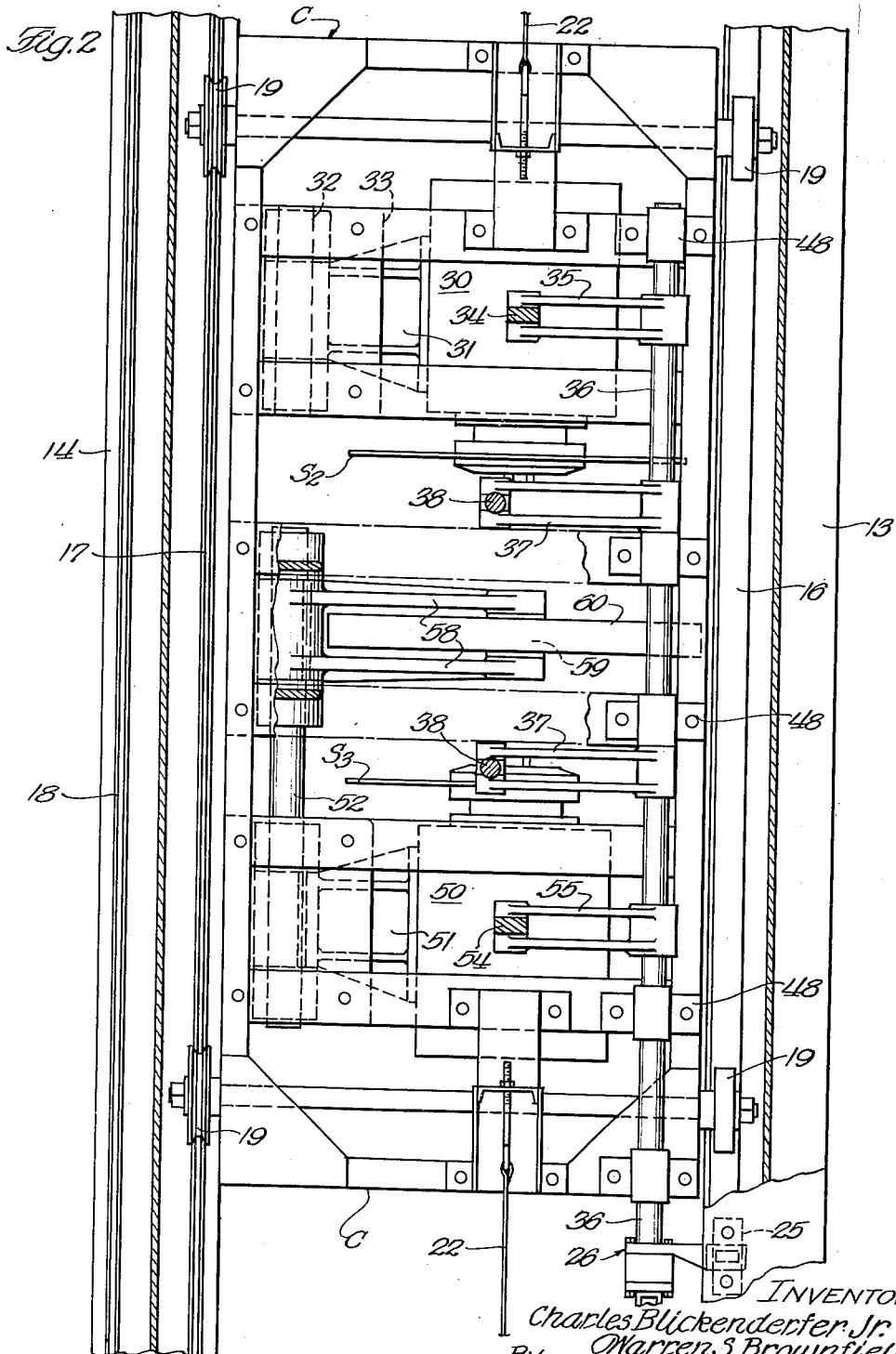

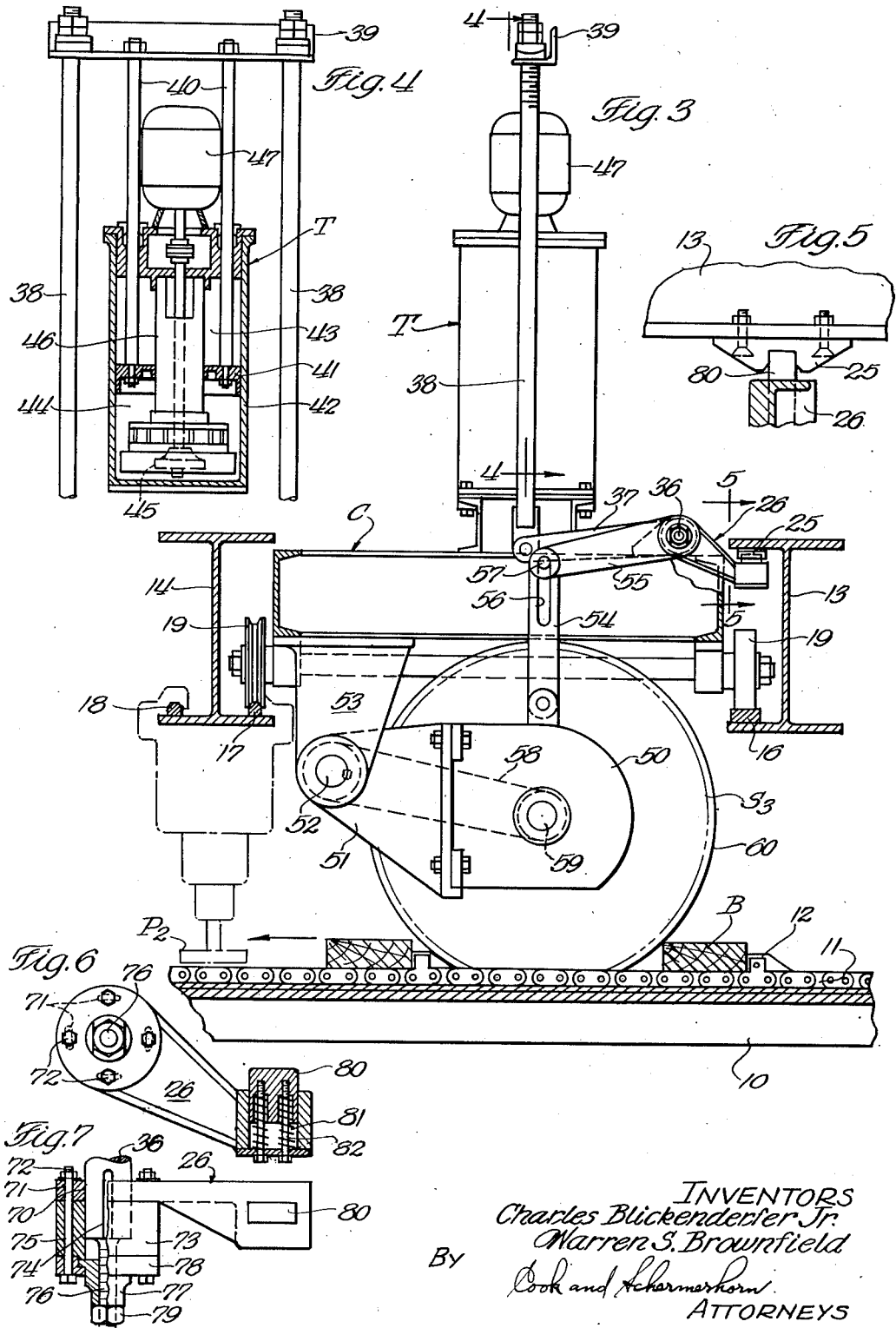

June 9, 1953  C. BLICKENDERFER, JR., ET AL  2,641,288
DOUBLE SAW CARRIAGE FOR LUMBER TRIMMING MACHINES
Filed June 13, 1950  4 Sheets-Sheet 4

INVENTORS
Charles Blickenderfer Jr.
Warren S. Brownfield
By Cook and Schermerhorn
ATTORNEYS Patented June 9, 1953

2,641,288

UNITED STATES PATENT OFFICE 2,641,288

DOUBLE SAW CARRIAGE FOR LUMBER TRIMMING MACHINES

Charles Blickenderfer, Jr., Puyallup, and Warren S. Brownfield, Tacoma, Wash., assignors to Weyerhaeuser Timber Company, Tacoma, Wash., a corporation of Washington Application June 13, 1950, Serial No. 167,878

9 Claims. (Cl. 143—41)

This invention relates to a saw carriage for the improved lumber trimming machine illustrated more generally in application Serial No. 167,877, filed June 13, 1950, and assigned to the assignee of the present invention.

It has been the practice heretofore in lumber trimming machines to employ one or the other of two common expedients to trim boards of varying random lengths to certain standard lengths, usually in two-foot increments. One expedient has been to provide a series of trimming saws at two-foot intervals above or below the plane of lumber traveling through the machine in edgewise movement on a conveyor. By means of levers or push button controlled devices, the operator could raise or lower a selected one of the saws to trim the board to the longest possible standard length. In installations where the lumber may vary considerably in length a large number of saws is required, each connected with a source of power and actuated by independent mechanism into trimming position.

To avoid the expense and complications of such an arrangement, a second expedient now commonly employed is to provide a saw carriage which can be traversed across the width of the trimming machine to position it at the proper station for trimming the board to the longest possible standard length. Such apparatus has proved quite successful, but it often necessitates a great deal of shifting of the saw carriage back and forth between two stations which are only two feet apart. If, for example, the boards coming to the trimming machine include mostly 18½ foot rough cut lengths and 20½ foot rough cut lengths, the saw carriage must be moved back and forth continually between the 18 and 20 foot positions, or else the routing procedure for the lumber must be changed so that different lengths will not be intermixed.

It is, therefore, the general object of the present invention to provide a saw carriage for a lumber trimming machine having a pair of saws spaced apart the usual increment between two consecutive standard lengths of lumber, so that two such lengths may be cut without moving the carriage. A particular object is to provide a saw carriage having a main saw and a secondary or auxiliary saw to cut lumber one increment shorter than the main saw, and equipped with means to render the auxiliary saw inoperative when the lumber is long enough to reach the main saw. A more specific object is to provide a double saw carriage of the type described having electrically operated means for raising both saws to clear the lumber skids and conveyor chains for traversing the carriage, and having separate mechanical means actuated by the lumber itself to raise the auxiliary saw to inoperative position when the lumber is to be trimmed by the main saw.

In the present trimming machine the saw carriage rides on transverse rails carried by beams extending across the machine above moving conveyor chains which carry the boards through the machine in edgewise movement. The two saws, together with their individual motors, are mounted for vertical rocking movement on horizontal shafts so that they may be lifted together by an electrically operated thrusting unit to raise both saws above the conveyor chains for traversing the carriage. When the carriage is latched in position at a sawing station, both saws drop to operative position in the path of any oncoming lumber on the conveyor. All lumber long enough to reach the main saw rides under a lifting wheel disposed between the two saws to lift the auxiliary saw temporarily to inoperative position in independent movement which is not communicated to the main saw. When the lumber extends only slightly beyond the auxiliary saw, the lifting wheel is not engaged by the lumber, and the lumber is then trimmed by the auxiliary saw to the next standard length shorter than the longer boards which are trimmed by the main saw, without moving the carriage.

Additional objects and advantages will become apparent to persons skilled in the art from the following detailed description of the preferred embodiment of the invention illustrated in the accompanying drawings. It is to be understood, however, that various changes may be made in the construction and arrangement of parts without departing from the spirit of the invention.

In the drawings:

Figure 1 is a cross sectional view of a trimming machine embodying the present invention, showing parts of the upper frame of the machine and the saw carriage in rear elevation;

Figure 2 is an enlarged plan view of the saw carriage, taken approximately on the line 2—2 of Figure 1;

Figure 3 is a sectional view showing the auxiliary carriage saw, taken on the line 3—3 of Figure 1;

Figure 4 is a generalized sectional view of the thrusting unit for raising the saws, taken on the line 4—4 of Figure 3;

Figure 5 is a detail view of the carriage latch, taken on the line 5—5 of Figure 3;

Figure 6 is a detail view of the latch arm, with parts in section;

Figure 7 is a detail view showing adjustments for the latch arm on the rocker shaft;

Figure 8:
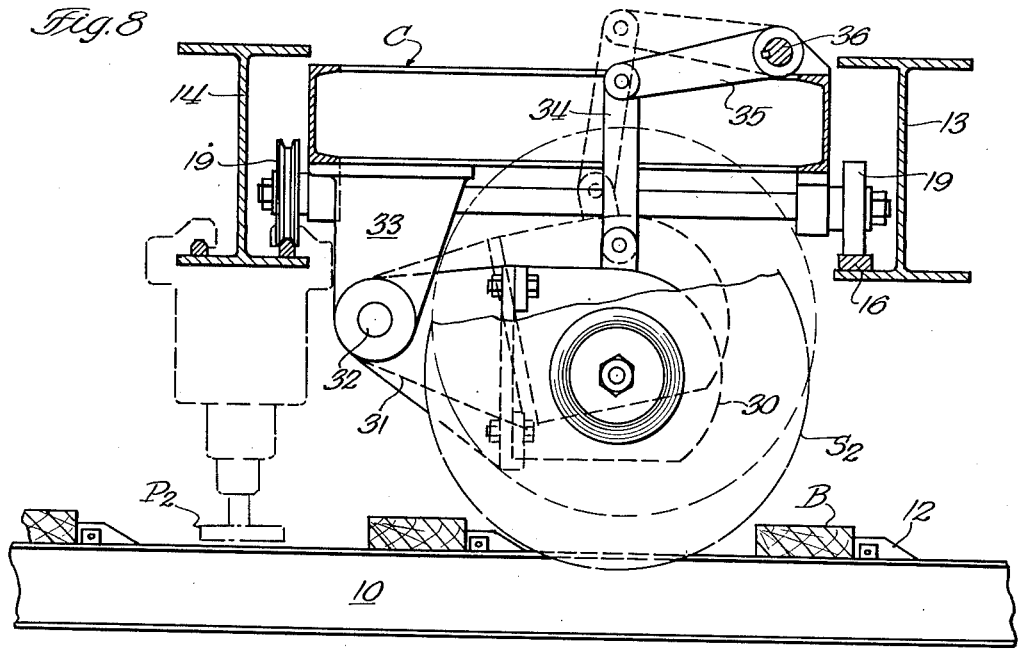
Figure 8 is a sectional view showing the main carriage saw, taken on the line 8—8 of Figure 1.

As shown in Figures 1 and 3, the trimming machine, in general, has a lower frame comprising a series of parallel longitudinal skids 10 having conveyor chains 11 equipped with lugs 12 for carrying boards in edgewise movement. The movement is toward the observer in Figure 1. Above this lower frame is an upper frame comprising a front transverse beam 13 and a rear transverse beam 14. In Figure 1 the plane of the view is taken between the two beams so that the rear beam 14 does not appear. To facilitate reading the drawings Figure 2 is oriented to place beam 13 on the right and beam 14 on the left as in Figures 3, 8 and 9.

At one end of the beams 13 and 14 is a support 15 for a stationary saw $S_1$ and a stationary end printer $P_1$. Extending along the beams are rails 16, 17 and 18 to support the saw carriage designated generally at C and a second end printer $P_2$ which is connected with the saw carriage. The saw carriage is equipped with wheels 19 to ride on the rails 16 and 17, and the printer $P_2$ is equipped with shoes to ride on the rails 17 and 18. In accordance with the principles of the invention, the carriage C carries a main saw $S_2$ and a secondary or auxiliary saw $S_3$ driven by individual electric motors. Through mechanism presently to be described both saws are raised in unison by a thrusting unit T to clear the skids and conveyor lugs for traversing the carriage.

The carriage C is traversed by means of a hand winch 20 having a crank 21 at one side of the machine. This winch controls the movements of a flexible cable 22 running over a pulley 23 at the opposite side of the machine, and having its ends attached to the carriage. The carriage is indexed at a plurality of sawing stations for cutting lumber to precise standard lengths by a series of latch plates 25, one of which is shown in Figure 5 to be engaged by a carriage latch arm 26. The usual standard lengths for lumber vary by two-foot increments, and so the latch plates 25 are set two feet apart on the beam 13 in such positions that the distance between the saws $S_1$ and $S_2$ will correspond to the standard lengths of lumber desired. Likewise, the saw $S_3$ is spaced two feet closer to the saw $S_1$ than the main saw $S_2$. Thus, if the carriage in Figure 1 is set at the 20 foot station, lumber trimmed by the saws $S_1$ and $S_2$ would be twenty feet long, and lumber trimmed by the saws $S_1$ and $S_3$ would be eighteen feet long.

Referring now to Figure 8, the saw $S_2$ is driven by a motor 30 mounted on a bracket 31 on a stub shaft 32. Shaft 32 is hung in a pair of brackets 33 on the under side of the carriage. This motor and saw are supported by a link 34 connected with an arm 35 keyed to a rocker shaft 36. The latch arm 26 is adjustably secured to this rocker shaft in a manner presently to be described.

Also keyed on rocker shaft 36 are a pair of arms 37 (Figs. 1 to 3) pivotally connected with the lower ends of lift rods 38 connecting with the thrusting unit T. The upper ends of lift rods 38 are connected to a cross bar 39 which is raised in the operation of the thrusting unit by a pair of vertical piston rods 40. The details of the thrusting unit form no part of the present invention, but it will be explained with reference to Figure 4 that the lower ends of piston rods 40 are connected to a piston 41 in a cylinder 42. Above the piston 41 is an oil chamber 43 and beneath the piston is an impeller chamber 44 containing a centrifugal impeller 45. A central oil tube 46 supplies oil to the inlet of impeller 45 from the oil chamber 43, so that when the impeller is driven by motor 47 pressure is developed in the impeller chamber 44 to raise the piston. The characteristic feature of this type of thrusting unit is that it will raise the piston rapidly to its upper limit of movement and hold it there as long as the motor continues to operate, without any damage to the mechanism. When the piston reaches its upper limit of movement, the impeller 45 spins freely in oil to maintain the lifting pressure until the motor is stopped. When the motor is stopped, any substantial weight on the piston such as the weight of a saw and its motor will cause the piston to descend in the cylinder. Both the speed of rise and speed of descent are controlled by suitable valves, not shown. The upward and downward movements are limited by stops in the thrusting unit which control the travel of the piston.

Rocker shaft 36 extends the length of the carriage through fixed bearings 48 and operates in a similar manner to lift the auxiliary saw $S_3$ along with the main saw $S_2$. Referring now to Figure 3, the saw $S_3$ is driven by a motor 50 mounted on a bracket 51 which is keyed to a shaft 52 supported by brackets 53 on the under side of the carriage. This saw is raised by the thrusting unit by means of a link 54 connected with another arm 55 keyed to the rocker shaft 36. An elongated slot 56 provides a lost motion connection with a pin 57 in the end of the arm 55, so that the saw $S_3$ may also be lifted by other means independently of the thrusting unit.

The shaft 52 for mounting the motor 50 is in axial alignment with the shaft 32 for mounting the motor 30, but it is important to note in Figure 2 that two separate shafts are involved and that there is no connection between them. Also keyed to the shaft 52 are a pair of arms 58 carrying a short axle 59 for a lifting wheel 60, the axle 59 being in alignment with the shaft of saw $S_3$ and the diameter of the lifting wheel being slightly greater than the saw diameter.

Figure 9:
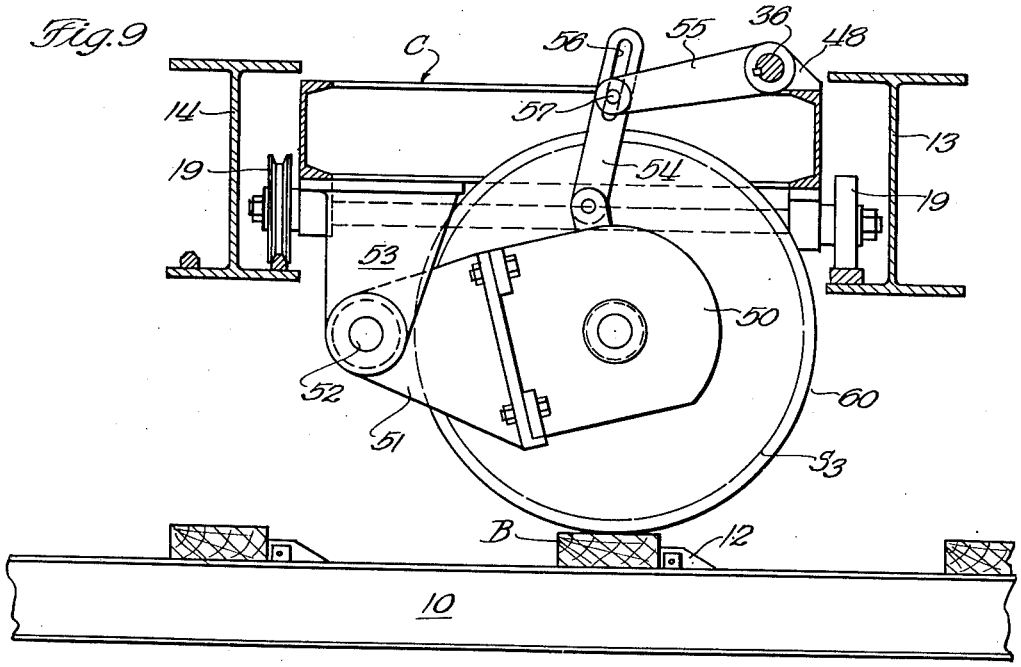
Figure 9 is a sectional view similar to Figure 3 to show the action of the lifting wheel for the auxiliary saw.

When the lifting wheel 60 encounters a board, as shown in Figure 9, it raises the auxiliary saw $S_3$ by reason of the keyed connection between the arms 58 and one end of shaft 52 and the keyed connection between motor bracket 51 and the other end of shaft 52. As the motor 50 and saw $S_3$ are thus raised by the lifting wheel 60, the link 54 slides up on the pin 57 without disturbing the rocker shaft 36. This board is then trimmed by the saws $S_1$ and $S_2$, and the saw $S_3$ is inoperative to cut the board. When the board has passed beyond the lifting wheel 60, the wheel drops down again, lowering the saw $S_3$ to its normal position shown in Figures 1 and 3. It will be apparent that this lifting movement of the saw $S_3$ by wheel 60 is entirely independent of the lifting movement effected by the thrusting unit, and that it does not operate to rotate rocker shaft 36 and unlatch the carriage from its indexed position on beam 13.

The numerals 65 and 66 in Figure 1 designate resilient hold-down shoes having runners to engage the boards and press them flat against the skids 11 for the sawing and end printing operations. These shoes are omitted from the other views. The conveyor lugs 12 are spaced apart on the chains 11 a distance approximately equal to the distance from the center of the saw to the center of the end printer, as viewed in Figures 3 and 4, whereby a trimmed board is passed between the two end printers at the same time the next board is passed between the saws. The printer $P_2$ is attached to the saw carriage in fixed relation to the main saw $S_2$ to mark boards trimmed by that saw and does not operate on boards trimmed by the auxiliary saw $S_3$. Boards trimmed between the saws $S_1$ and $S_3$ are marked on only one end. Printer $P_2$ includes its own means, not connected with the saw lifting means, for raising the printing die to clear the conveyor lugs when the carriage is traversed.

The hold-down shoe 66 on the saw carriage is lifted clear of the lugs on the conveyor chains 11, along with the two saws, when the carriage is traversed on the overhead beams 13 and 14. For this purpose a chain or cable 67 is connected at its upper end to one of the arms 37 on the rocker shaft 36 as indicated in Figure 1 and connected at its lower end to the shoe 66 as shown in greater detail in application Serial No. 167,882, filed June 13, 1950.

Figures 6 and 7 illustrate provisions for axial and angular adjustment of carriage latch arm 26 relative to rocker shaft 36. Arm 26 has a circular hole 70 to receive shaft 36 and a plurality of arcuate slots 71 to receive the bolts 72. A hub 73 is keyed to the shaft at 74 and equipped with holes 75 to fit the bolts 72 whereby arm 26 may be clamped against the hub in different angular positions. For axial adjustment the shaft has a threaded end 76 to receive a nut 77. This nut is clamped against one end of hub 73, for relative rotation, by a collar 78 under the heads of bolts 72 as shown. Jam nut 79 locks the nut in adjusted position.

The arm 26 is preferably equipped with a resilient latch tongue 80 to fit the notches in latch plates 25. Tongue 80 is urged outwardly from the upper side of the arm by springs 81 on studs 82 so as to seat properly in the notch of the latch plate without subjecting arm 26 to the load of supporting the saws and their motors. When the saws wear down to a smaller radius they must be dropped to a lower position by adjusting the supporting stops in the thrusting unit, and when this adjustment exceeds the movement of tongue 80 in the arm 26 the arm may be adjusted rotatively on shaft 36 in the manner described. Thus the arm 26 serves as an indexing stop for traverse movements of the saw carriage while springs 81 limit torque loads on the arm when the saws are lowered to sawing position.

It will be understood by persons skilled in the art that flexible cables or other suitable means are provided to carry the electrical circuits for the saw motors and thrusting unit motor, but these and other details not important to the present invention are not illustrated.

Having now described our invention and in what manner the same may be used, what we claim as new and desire to protect by Letters Patent is:

1. In a saw carriage for a lumber trimming machine, a pair of spaced saws, a latch for indexing the carriage at a plurality of sawing stations, lifting mechanism connected with both of said saws and said latch for lifting both saws and releasing said latch for traverse of the carriage, lumber engaging means disposed between said saws having direct positive connection with only one of said saws to lift said one saw when said means is engaged by lumber, and a lost motion element in the connection between said lifting mechanism and said one saw to disjoin said lifting mechanism and thereby the other saw and said latch from the lifting action of said means.

2. In a saw carriage for a lumber trimming machine, a first saw mounted for vertical movement, a second saw spaced from said first saw to trim lumber to a different length and having a supporting bracket keyed to a horizontal shaft, a latch for indexing the carriage at a plurality of sawing stations, a thrusting unit connected with both saws and said latch to raise said saws and release the latch for traverse of the carriage, the connection between said thrusting unit and said second saw including a lost motion link, and a lumber engaging lifting wheel mounted on arms keyed to said shaft for lifting only said second saw within the range of lost motion provided by said link when said lifting wheel rides over lumber passing through the machine.

3. In a saw carriage for a lumber trimming machine, a first saw mounted for vertical movement, a second saw axially spaced from said first saw and mounted on a supporting member for vertical movement, a horizontal shaft keyed to said member, a lumber engaging lifting wheel mounted on arms keyed to said shaft, a rocker shaft having arms for lifting said saws, a carriage latch arm on said rocker shaft, a lifting unit connected with said rocker shaft to lift both of said saws and release said latch, and a lost motion connection between said second saw and said rocker arm to accommodate the lifting of said second saw by said lifting wheel without rotating said rocker shaft.

4. In a saw carriage for a lumber trimming machine and the like, a rocker shaft extending longitudinally of the carriage for lifting the saw to traverse the carriage, an arm on said shaft having a spring actuated latch tongue to index the carriage in a plurality of sawing positions, means for securing said arm on said shaft, in different relative angular positions to adjust for wear of the saw, and means for adjusting the axial position of said arm on said shaft.

5. In a saw carriage for a lumber trimming machine, a first saw mounted for vertical movement, a second saw axially spaced from said first saw and mounted for vertical movement, a latch for indexing the carriage at a plurality of sawing stations, a lifting unit connected with said first saw and said latch and connected with said second saw through a lost motion connection to raise said saws and release said latch for traverse of the carriage, and a lumber engaging lifting wheel disposed between said saws and operatively connected with said second saw for lifting only said second saw within the range of movement provided by said lost motion connection when said lifting wheel rides over lumber passing through the machine.

6. In a saw carriage for a lumber trimming machine, a first saw mounted for vertical movement, a second saw axially spaced from said first saw and mounted on a supporting member for vertical movement, a lumber engaging lifting wheel mounted on said supporting member and disposed between said saws, power operated lifting means for said saws, a latch for indexing the carriage to a plurality of sawing stations operable by said lifting means, a mechanical connection between said first saw and said lifting means, and a lost motion connection between said second saw and said lifting means to accommodate the lifting of said second saw by said lifting wheel without moving said lifting means.

7. In a traversing saw carriage for a lumber trimming machine and the like, a rocker shaft extending longitudinally of the carriage, lifting arms on said rocker shaft for supporting the saw, a lifting unit connected with said rocker shaft to move said saw vertically between sawing and non-sawing positions, the angular sawing position of said shaft varying with the diameter of the saw as the saw becomes worn, an arm on said shaft having a spring actuated latch tongue to index the carriage in a plurality of sawing positions, and means for securing said arm on said shaft in different relative angular positions to maintain said latch arm in the same latched position relative to the machine as the sawing position of said saw and shaft change due to wear of the saw.

8. In a traversing saw carriage for a lumber trimming machine, a pair of axially spaced trimming saws mounted for independent vertical movement, a rocker shaft having arms connected with said saws for lifting both of the saws simultaneously, a carriage latch operable by said rocker shaft for indexing the carriage at a plurality of sawing stations, a vertically movable lumber engaging member between said saws connected with one of said saws to lift said one saw alone when said member is engaged by lumber extending between the saws, a lost motion element in the connection between said one saw and said rocker shaft to disjoin said rocker shaft and thereby the other saw and said latch from the lifting action of said lumber engaging member, and a thrusting unit for rotating said rocker shaft to lift both of said saws and lumber engaging member and disengage said latch for traversing the carriage.

9. In a traversing saw carriage for a lumber trimming machine, a pair of axially spaced trimming saws mounted for independent vertical movement, a latch for indexing the carriage at a plurality of sawing stations, a lifting member connected with one of said saws and said latch and connected with the other saw through a lost motion connection, a lumber engaging member between said saws operatively connected with said other saw for lifting only said other saw within the range of movement provided by said lost motion connection, when said lumber engaging member rides over lumber passing through the machine, and a lifting unit connected with said lifting member to raise both of said saws and said lumber engaging member and release said latch for traverse of the carriage.

CHARLES BLICKENDERFER, Jr.
WARREN S. BROWNFIELD.

References Cited in the file of this patent

UNITED STATES PATENTS

| Number | Name | Date |
|---|---|---|
| 379,659 | Parish | Mar. 20, 1888 |
| 1,267,130 | Skeith et al. | May 21, 1918 |
| 1,894,415 | Onstad | Jan. 17, 1933 |
| 1,969,425 | Richardson | Aug. 7, 1934 |
| 1,977,971 | Payzant et al. | Oct. 23, 1934 |
| 2,016,799 | De Koning | Oct. 8, 1935 |
| 2,091,647 | Nicholson | Aug. 31, 1937 |